United States Patent
McGrew, Jr. et al.

(10) Patent No.: US 11,572,933 B2
(45) Date of Patent: *Feb. 7, 2023

(54) SANDWICHED GEAR TRAIN ARRANGEMENT FOR MULTIPLE ELECTRIC MOTOR MIXED-SPEED CONTINUOUS POWER TRANSMISSION

(71) Applicant: Allison Transmission, Inc., Indianapolis, IN (US)

(72) Inventors: Arthur L. McGrew, Jr., Indianapolis, IN (US); Isaac Mock, Martinsville, IN (US); George S. Pelton, Indianapolis, IN (US); James Allen Raszkowski, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,765

(22) Filed: Dec. 6, 2021

(65) Prior Publication Data

US 2022/0090654 A1    Mar. 24, 2022

Related U.S. Application Data

(63) Continuation of application No. PCT/US2021/070643, filed on Jun. 1, 2021, and a
(Continued)

(51) Int. Cl.
*F16H 3/72* (2006.01)
*B60K 17/02* (2006.01)
(Continued)

(52) U.S. Cl.
CPC .............. *F16H 3/724* (2013.01); *B60K 1/02* (2013.01); *B60K 17/02* (2013.01); *B60K 17/08* (2013.01);
(Continued)

(58) Field of Classification Search
CPC .. F16H 3/724; F16H 3/727; F16H 2200/0021; F16H 2200/2007;
(Continued)

(56) References Cited

U.S. PATENT DOCUMENTS 5,168,946 A * 12/1992 Dorgan .................... B60L 7/22
475/5
5,289,890 A    3/1994 Toyoda et al.
(Continued)

FOREIGN PATENT DOCUMENTS

DE    10235257 A1    2/2003
EP    2449286 B1    3/2013
(Continued)

OTHER PUBLICATIONS

McGrew et al., U.S. Appl. No. 15/929,414 (unpublished), 64 pages, 64 pages, filed Apr. 30, 2020.
(Continued)

*Primary Examiner* — Charles A Fox
*Assistant Examiner* — Farhana Pervin
(74) *Attorney, Agent, or Firm* — Woodard, Emhardt, Henry, Reeves & Wagner, LLP

(57) ABSTRACT

An electric powertrain includes a first electric motor that has an uninterrupted connection with a drive shaft of a vehicle. The electric powertrain further includes a first gear train that has an interruptible connection with the drive shaft. In one form, this interruptible connection includes a second carrier and a clutch engagement member. The electric powertrain further includes a sun gear in the form of a ring gear and planet gears in the form of a first output shaft. To provide a compact configuration, the first electric motor and the first gear train are sandwiched between the sun gear and the planet gears.

20 Claims, 5 Drawing Sheets

Related U.S. Application Data continuation of application No. 15/929,977, filed on Jun. 1, 2020, now Pat. No. 11,193,562, which is a continuation of application No. 15/929,977, filed on Jun. 1, 2020, now Pat. No. 11,193,562.

(51) Int. Cl.
  *B60K 17/08* (2006.01)
  *B60K 1/02* (2006.01)

(52) U.S. Cl.
  CPC ..... *B60Y 2200/91* (2013.01); *B60Y 2400/427* (2013.01); *B60Y 2400/73* (2013.01); *F16H 2200/0021* (2013.01); *F16H 2200/201* (2013.01); *F16H 2200/2007* (2013.01); *F16H 2200/2064* (2013.01); *F16H 2200/2066* (2013.01); *F16H 2200/2082* (2013.01); *F16H 2200/2094* (2013.01)

(58) Field of Classification Search
  CPC ....... F16H 2200/201; F16H 2200/2064; F16H 2200/2066; F16H 2200/2082; F16H 2200/2094; B60K 17/02; B60K 17/08; B60K 17/26; B60K 1/02; B60Y 2200/91; B60Y 2400/427; B60Y 2400/73
  See application file for complete search history.

(56) References Cited

U.S. PATENT DOCUMENTS

| | | | |
|---|---|---|---|
| 5,931,757 | A | 8/1999 | Schmidt |
| 6,793,600 | B2 | 9/2004 | Hiraiwa |
| 7,325,291 | B2 | 2/2008 | Ahnert |
| 7,935,015 | B2 | 5/2011 | Tabata et al. |
| 8,196,687 | B2 | 6/2012 | Swales et al. |
| 8,454,473 | B2 | 6/2013 | Reitz |
| 9,120,480 | B2 | 9/2015 | Kiuchi |
| 9,168,911 | B2 | 10/2015 | Hayashi et al. |
| 9,381,800 | B2 | 7/2016 | Sakai et al. |
| 9,421,856 | B2 | 8/2016 | Frank et al. |
| 9,457,658 | B2 | 10/2016 | Knoblauch |
| 9,463,698 | B2 | 10/2016 | Severinsky et al. |
| 9,566,852 | B2 | 2/2017 | Knoblauch et al. |
| 9,566,857 | B1 | 2/2017 | Pritchard et al. |
| 10,144,309 | B2 | 12/2018 | Leng et al. |
| 10,183,570 | B2 | 1/2019 | Kimes et al. |
| 10,220,725 | B2 | 3/2019 | Rush et al. |
| 10,220,726 | B2 | 3/2019 | Zing et al. |
| 10,421,350 | B2* | 9/2019 | Morrow .................. B60K 6/445 |
| 11,040,607 | B2 | 6/2021 | McGrew et al. |
| 2005/0003929 | A1 | 1/2005 | Fidlin et al. |
| 2007/0049440 | A1* | 3/2007 | Raghavan ............... F16H 3/728 475/5 |
| 2007/0093341 | A1 | 4/2007 | Supina et al. |
| 2008/0182693 | A1* | 7/2008 | Holmes .................... F16D 11/14 475/5 |
| 2008/0234097 | A1 | 9/2008 | Sah |
| 2009/0029824 | A1 | 1/2009 | Tabata et al. |
| 2009/0084653 | A1 | 4/2009 | Holmes |
| 2009/0159349 | A1 | 6/2009 | Ebuchi et al. |
| 2010/0048338 | A1 | 2/2010 | Si |
| 2010/0179009 | A1* | 7/2010 | Wittkopp ............... B60K 6/547 475/5 |
| 2010/0227722 | A1 | 9/2010 | Conlon |
| 2011/0070992 | A1* | 3/2011 | Si .......................... B60K 6/547 475/284 |
| 2011/0251747 | A1 | 10/2011 | Imai et al. |
| 2013/0095970 | A1* | 4/2013 | Conlon .................. B60K 6/445 475/5 |
| 2013/0338861 | A1* | 12/2013 | Hessell .................. B60W 10/08 180/65.23 |
| 2015/0229162 | A1 | 8/2015 | Gottfried |
| 2016/0047439 | A1 | 2/2016 | Kimes et al. |
| 2016/0082823 | A1 | 3/2016 | Park et al. |
| 2016/0230850 | A1* | 8/2016 | Kanada .................... B60K 6/54 |
| 2016/0325730 | A1 | 11/2016 | Ono et al. |
| 2017/0182995 | A1 | 6/2017 | Endo et al. |
| 2017/0327107 | A1 | 11/2017 | Ando et al. |
| 2018/0290534 | A1 | 10/2018 | Pan et al. |
| 2019/0077255 | A1 | 3/2019 | Misu et al. |
| 2019/0077259 | A1 | 3/2019 | Singh et al. |
| 2019/0078666 | A1 | 3/2019 | Duhaime et al. |
| 2021/0008968 | A1 | 1/2021 | McGrew et al. |
| 2021/0188066 | A1 | 6/2021 | McGrew et al. |
| 2021/0188075 | A1 | 6/2021 | Mock et al. |

FOREIGN PATENT DOCUMENTS

| | | |
|---|---|---|
| WO | 2013094005 A1 | 6/2013 |
| WO | 2018224742 A1 | 12/2018 |

OTHER PUBLICATIONS

PCT, Int. App. No. PCT/US2021/070653 International Search Report, 3 pages, dated Sep. 27, 2021.

PCT, Int. App. No. PCT/US2021/070653 Written Opinion, 6 pages, dated Sep. 27, 2021.

* cited by examiner

SANDWICHED GEAR TRAIN ARRANGEMENT FOR MULTIPLE ELECTRIC MOTOR MIXED-SPEED CONTINUOUS POWER TRANSMISSION

REFERENCE TO RELATED APPLICATIONS

This application is a continuation of U.S. patent application Ser. No. 15/929,977, filed Jun. 1, 2020, which is hereby incorporated by reference. This application is also a continuation of International Patent Application Number PCT/US2021/070643, filed Jun. 1, 2021, which is hereby incorporated by reference. International Patent Application Number PCT/US2021/070643, filed Jun. 1, 2021, is a continuation of U.S. patent application Ser. No. 15/929,977, filed Jun. 1, 2020, which are hereby incorporated by reference.

BACKGROUND

There has recently been an increased interest in hybrid and electric vehicles. However, the recent developments have mostly been related to the consumer passenger vehicle market. The same technology has not yet been made available in the commercial vehicle marketplace. The current electric motors used in consumer vehicles are generally not able to be easily retrofitted into commercial vehicles. Retrofitting the electric motors into the powertrain would, in most cases, require a full redesign of the powertrain components. Furthermore, there is the issue of the loss of power during a shift in an electric vehicle. This issue would be most prevalent in a heavy commercial vehicle as the loss of power will result in vehicular deceleration that would be readily perceptible by the driver.

Thus, there is a need for improvement in this field.

SUMMARY

A multiple electric motor system has been developed to address the issues mentioned above as well as other issues. In one form, the system includes dual electric motors that provide power to an output such as a driveshaft of a vehicle. One of the electric motors ("A"), which will be referred to as the "first motor" for our purposes, is always connected to the output drive shaft in order to continuously provide power for propelling the vehicle. In other words, the first electric motor (A) has an uninterrupted connection with the output. The system further includes a second electric motor ("B") that intermittently applies torque to the output shaft. In one variation, this intermittent connection between the second electric motor (B) and the output includes at least one clutch. The clutch engages and disengages the second electric motor (B) with the output shaft.

To address the issue of retrofit due to space constraints, the first electric motor (A) and the second electric motor (B) are sandwiched between the first gear train and the second gear train. To put this differently, one of the gear trains may be located upstream of both motors while the other may be located downstream from both motors, where upstream is defined as opposite the direction of power transmission and downstream is defined as in the direction of power transmission. Additionally, there may be a dog clutch located between the first and second electric motors. This clutch will serve to selectively couple the first and second output shafts and allow the second electric motor to contribute to the output.

The sandwiched configuration allows for the overall size of the transmission to be reduced. This reduction in size will allow for the transmission to be retrofitted into commercial vehicles without the need for a major redesign in the powertrain configuration.

Aspect 1 generally concerns a system that includes a first electric motor connected to an output and a second electric motor connected to the output.

Aspect 2 generally concerns the system of any previous aspect in which the first electric motor and the second electric motor are sandwiched between a first gear train and a second gear train.

Aspect 3 generally concerns the system of any previous aspect in which the first electric motor and the second electric motor both have an interruptible connection to the output.

Aspect 4 generally concerns the system of any previous aspect in which the first electric motor has an uninterrupted connection to the output and the second electric motor has an interruptible connection to the output.

Aspect 5 generally concerns the system of any previous aspect in which the interruptible connection includes a clutch configured to couple the second electric motor to the output.

Aspect 6 generally concerns the system of any previous aspect in which the clutch includes a positive clutch.

Aspect 7 generally concerns the system of any previous aspect in which the clutch has an actuator and a Selectable One-Way Clutch (SOWC).

Aspect 8 generally concerns the system of any previous aspect in which the clutch is located between the first electric motor and the second electric motor.

Aspect 9 generally concerns the system of any previous aspect in which the clutch is located downstream of the first electric motor and the second electric motor at the output.

Aspect 10 generally concerns the system of any previous aspect in which the second gear train is located upstream from the first electric motor and the second electric motor.

Aspect 11 generally concerns the system of any previous aspect in which the Selectable One-Way Clutch (SOWC) is located upstream from the first electric motor and the second electric motor at the second gear train.

Aspect 12 generally concerns the system of any previous aspect in which the second electric motor is located upstream relative to the first electric motor.

Aspect 13 generally concerns the system of any previous aspect in which the first gear train is located upstream from the first electric motor and the second electric motor.

Aspect 14 generally concerns the system of any previous aspect in which the Selectable One-Way Clutch (SOWC) is located upstream of the first electric motor and the second electric motor at the first gear train.

Aspect 15 generally concerns the system of any previous aspect in which the first electric motor is located upstream relative to the second electric motor.

Aspect 16 generally concerns the system of any previous aspect in which the first gear train includes a planetary gear.

Aspect 17 generally concerns the system of any previous aspect in which the first and second electric motors rotate about a common axis of rotation.

Aspect 18 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
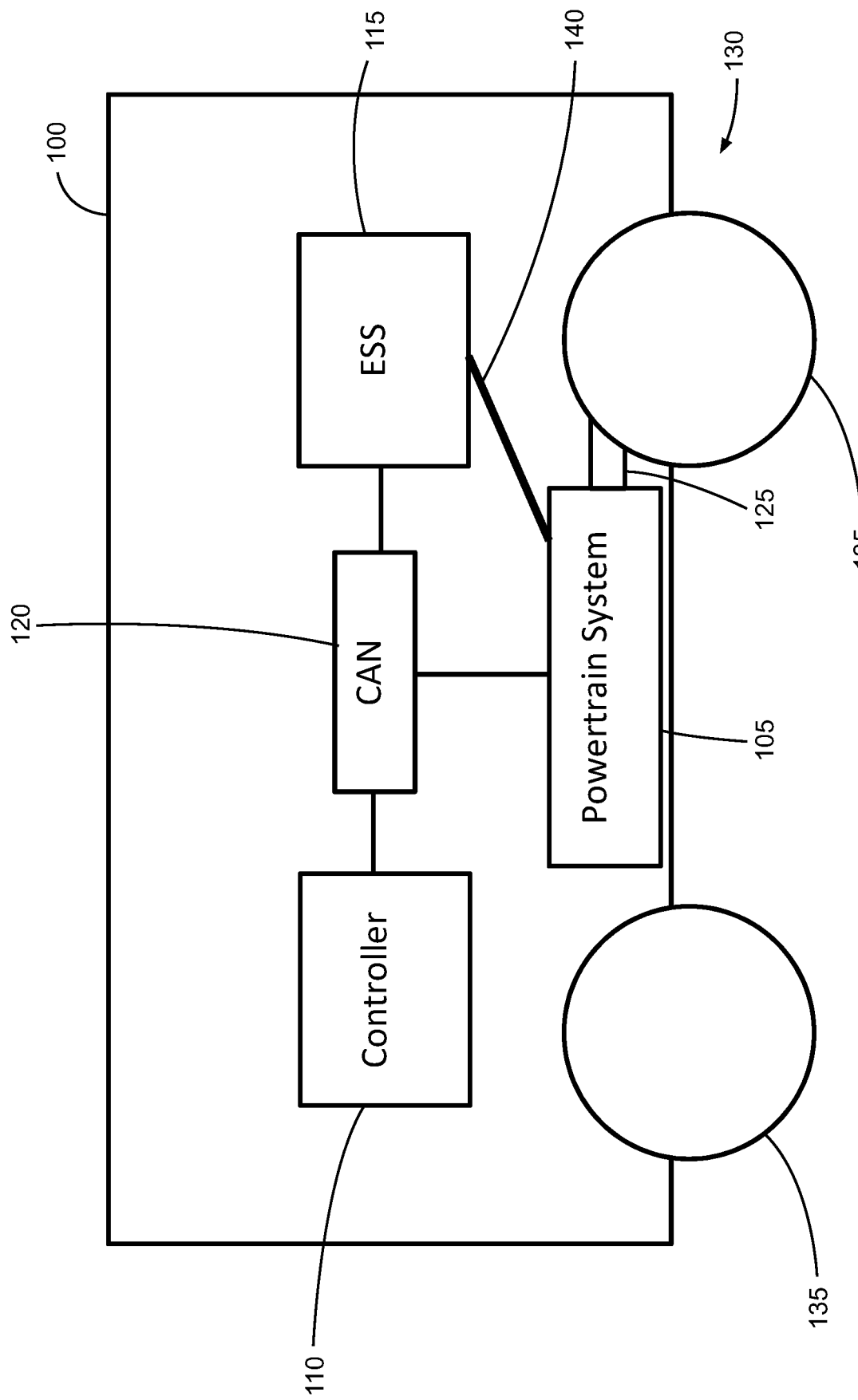
FIG. 1 is a diagrammatic view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A vehicle 100 according to one example is illustrated in FIG. 1. As shown, the vehicle 100 includes at least one powertrain system 105, at least one controller 110, and at least one Energy Storage System ("ESS") 115 configured to supply power to the powertrain system 105. The powertrain system 105, controller 110, and ESS 115 are operatively connected together so as to communicate with one another via at least one Controller Area Network ("CAN") 120. The controller 110 is configured to control the operation of one or more systems and/or other components of the vehicle 100 such as the powertrain system 105 and ESS 115. The powertrain system 105 has an output or drive shaft 125 that transfers mechanical power from the powertrain system 105 to a propulsion system 130. In the illustrated example, the propulsion system 130 includes one or more wheels 135, but the propulsion system 130 in further examples can include other types of propulsion devices like continuous track systems. One or more power cables 140 transfer electrical power between the powertrain system 105 and the ESS 115.

The powertrain system 105 is designed to electrically propel the vehicle 100 in an efficient manner. As will be explained in greater detail below, the powertrain system 105 is designed to power heavy-duty commercial and/or military grade vehicles such as buses, garbage trucks, delivery trucks, fire trucks, and semi-trailers. The powertrain system 105 is designed to electrically power vehicles 100 with a class group rating of at least four (4) according to the US Department of Transportation Federal Highway Administration (FHWA) classification rule set. In one form, the powertrain system 105 is configured to move at least 40,000 pound (18,144 Kg) passenger vehicles like buses. The powertrain system 105 has a unique, compact centerline design that allows the powertrain system 105 to be easily retrofitted into pre-existing vehicle chassis designs and/or conventional drivetrains with minimal changes to the other parts of the vehicle 100 like the braking and suspension systems. This in turn allows existing internal combustion type vehicles to be readily reconfigured as fully electric vehicles. Moreover, the centerline design of the powertrain system 105 reduces gear loss and other power losses so as to make the vehicle 100 more power efficient which in turn can improve driving range and/or reduce weight of other components such as the ESS 115.

Figure 2:
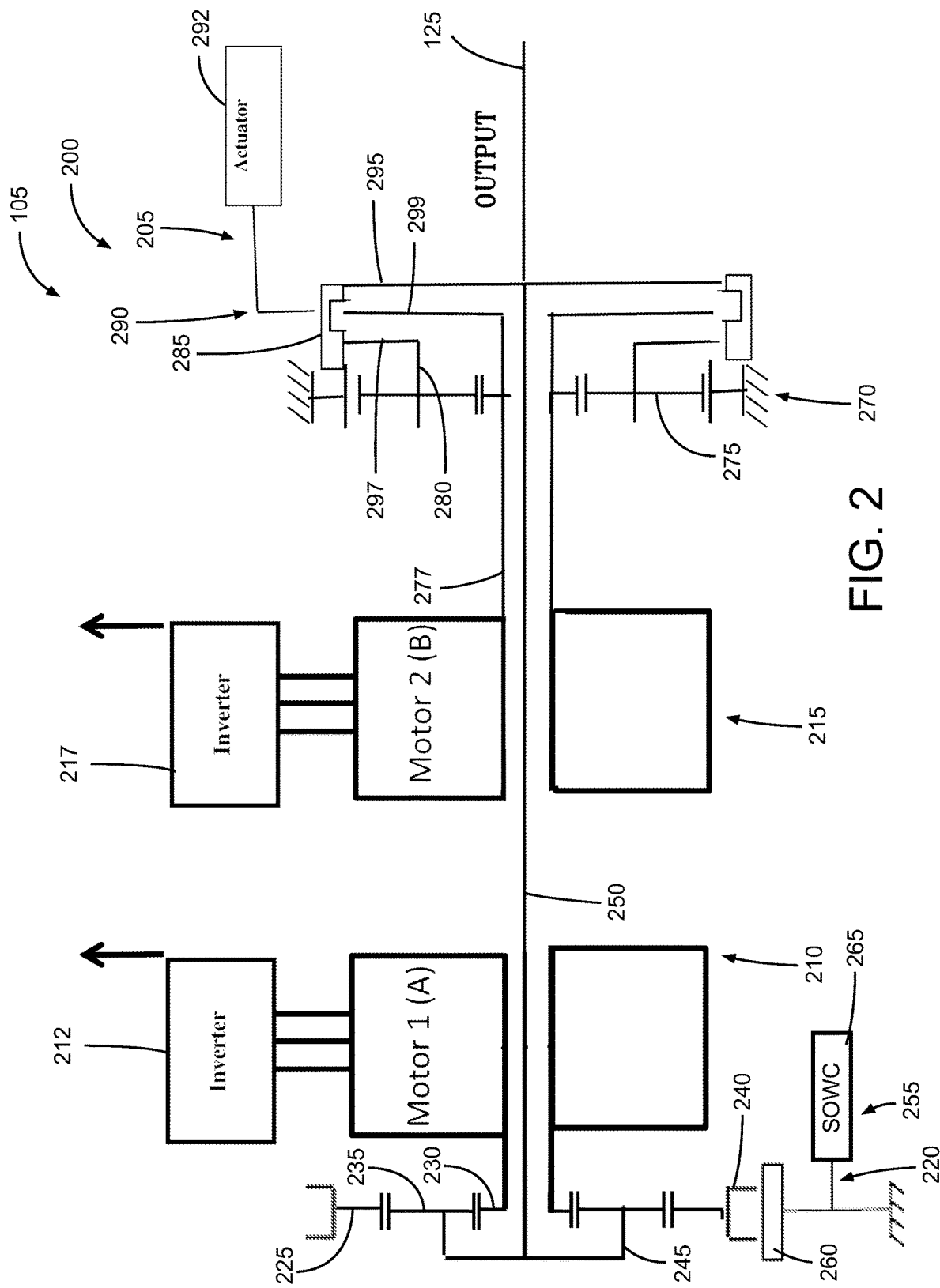
FIG. 2 is a diagrammatic view of an example of an electric powertrain that can be used in the vehicle of FIG. 1.

FIG. 2 shows an electric powertrain 200 that can be used in the electric powertrain system 105. The electric powertrain 200 includes a first electric motor 210 with a first inverter 212 and a second electric motor 215 with a second inverter 217. In this illustrated example, the first electric motor 210 and second electric motor 215 are not the same type of motor such that the first electric motor 210 and second electric motor 215 are not interchangeable with one another. By using different types of motors, which can have different speed, torque, and/or power characteristics, the efficiency and power characteristics of the electric powertrain 200 can be enhanced. In other words, one of the motors can compensate for the deficiencies of the other under different operational demands. For instance, when the electric powertrain 200 is dealing with a load that requires high torques at low speeds, a low-speed, high-torque motor can provide most (if not all) of the power, and the corresponding high-speed, low-torque motor can provide less power. When the conditions reverse to a low torque, high speed situation, the workloads of the motors can reverse such that the high-speed, low-torque motor provides more (or all) of the power, and the low speed, high torque motor provides less power.

As shown, the first electric motor 210 is located upstream of the drive shaft 125 relative to the second electric motor 215. In the illustrated example, the first electric motor 210 is a high speed electric motor, and the second electric motor 215 is a low speed electric motor. In one version, the first electric motor 210 is a high speed electric motor having a rated operating speed of at least 5,000 rpm, and the second electric motor 215 is a low speed electric motor having a rated operating speed of less than 5,000 rpm. The first electric motor 210 in one version has a rated operating speed of at least 10,600 rpm, a rated peak power of at least 250 hp, a rated continuous power of at least 150 hp, a rated continuous torque of at least 240 lb-ft, and a rated peak torque of at least 310 lb-ft. In this version, the second electric motor 215 has a rated operating speed of at most 4,500 rpm, a rated peak power of at least 250 hp (600 Volts DC), a rated continuous power of at least 133 hp (600 Volts DC), a rated continuous torque of at least 320 lb-ft, and a rated peak torque of at least 735 lb-ft. The speed of the second electric motor 215 in one form is limited to a maximum speed of 3,500 rpm during operation.

The first inverter 212 and second inverter 217 convert DC from the ESS 115 to AC in order to power the first electric motor 210 and second electric motor 215, respectively. The first electric motor 210 and second electric motor 215 can also act as generators such as during regenerative braking. In such a situation, the first inverter 212 and second inverter 217 act as rectifiers by converting the AC electrical power from the first electric motor 210 and second electric motor 215, respectively, to DC power that is supplied to the ESS 115. In the illustrated example, the first inverter 212 and second inverter 217 include combined inverter-rectifiers that at least convert DC to AC and AC to DC.

As can be seen in FIG. 2, a transmission 205 further includes a first gear train 220. The first gear train 220 is located at the output end of the first electric motor 210 which is located on the end of the electric powertrain 200 that is opposite to the drive shaft 125. The first electric motor 210 and second electric motor 215 are sandwiched between the first gear train 220 and second gear train 270. Among other things, this sandwiched relationship simplifies assembly and enhances performance. For instance, this sandwiched configuration in which the first electric motor 210 and second electric motor 215 are located between the first gear train 220 and second gear train 270 aids in retrofitting the powertrain system 105 to pre-existing vehicle designs. With the gearing as the ends, multiple electric powertrains 200 can be daisy chained together so as to share gearing between the electric powertrains 200. Moreover, all or some of the equipment related to the motors can be shared or concentrated in one area. The first electric motor 210 and second electric motor 215 can also be packed closely together so as to conserve space. The first gear train 220 includes a first planetary gear 225. As depicted, the first planetary gear 225 has a sun gear 230 that is attached to the first electric motor 210, one or more planet gears 235 engaged to orbit around the sun gear 230, and a ring gear 240 that surrounds the planet gears 235. The planet gears 235 engage both the sun gear 230 and ring gear 240. The planet gears 235 are secured to a first carrier 245.

The electric powertrain 200 further has a first output shaft 250 that connects the first carrier 245 of the first planetary gear 225 to the drive shaft 125. Proximal to the drive shaft 125, the clutch engagement member 295 extends radially from the first output shaft 250. As illustrated, the first output shaft 250 extends in a longitudinal direction through the first electric motor 210, second electric motor 215, and a second output shaft 277. The first output shaft 250 extends in a concentric manner with the second output shaft 277. The first electric motor 210 and second electric motor 215 in one example are respectively secured to the first planetary gear 225 and second output shaft 277 via spline type connections. The first electric motor 210 can have an uninterrupted connection to the drive shaft 125 via the first planetary gear 225 and first output shaft 250, if so desired.

The transmission 205 further includes a Selectable One-Way Clutch ("SOWC") 255 that is able to engage and disengage the ring gear 240 such that ring gear 240 is able to be stationary or rotate. In the illustrated example, the SOWC 255 includes a clutch engagement member 260 configured to engage the ring gear 240 of the first planetary gear 225 and a clutch actuator 265 that selectively engages the clutch engagement member 260 with the ring gear 240 to provide torque from the first electric motor 210 to the first output shaft 250. The clutch actuator 265 is operatively coupled to the controller 110 so that the controller 110 is able to control the operation of the SOWC 255.

When the clutch actuator 265 of the SOWC 255 disengages the clutch engagement member 260 from the ring gear 240, the ring gear 240 is able to rotate or orbit around the sun gear 230 in the first planetary gear 225. With the ring gear 240 in this disengaged state in which the ring gear 240 is able to move, the first carrier 245 remains generally stationary even when the first electric motor 210 rotates or applies torque to the sun gear 230 of the first planetary gear 225. Consequently, torque is not transferred from the first electric motor 210 to the drive shaft 125. In another embodiment, when torque from the first electric motor 710 is not required, the first electric motor 710 can be shut down. This prevents the rotation of the first electric motor 710. As a result, no torque is provided to the drive shaft 125. On the other hand, when the controller 110 via the clutch actuator 265 engages the clutch engagement member 260 with the ring gear 240, relative movement of the ring gear 240 is prevented. Having the ring gear 240 fixed allows the first carrier 245 to rotate as the first electric motor 210 rotates the sun gear 230 which in turn allows torque to be transferred from the first electric motor 210 to the drive shaft 125 along the first output shaft 250. The first electric motor 210 is again a high speed motor. The first planetary gear 225 reduces the output speed of the first electric motor 210 such that the speed of the first output shaft 250 can generally match the speed of the lower speed, second electric motor 215, if needed.

A second gear train 270 and a clutch 285 in the electric powertrain 200 operate in a similar fashion as described before. The controller 110 via a clutch actuator 292 shifts a dog clutch 290 between neutral, first range, and second range positions so that the second electric motor 215 is able to provide different torques (or not) to a clutch engagement member 295 that are combined with the torque from the first electric motor 210 at the drive shaft 125. When the dog clutch 290 is in a neutral position, the second electric motor 215 does not supply power to the drive shaft 125. In such a case, the first electric motor 210 can supply all of the power to the drive shaft 125, if required. Once more, the first electric motor 210 can also act as a generator during regenerative braking so as to recharge the ESS 115. The dog clutch 290 engages a first range member 297 to place the clutch 285 in the first range position where the second electric motor 215 is able to provide higher torques through a second planetary gear 275 connected by a second carrier 280 and first range member 297 to the drive shaft 125. The dog clutch 290 shifts to the second range position by engaging a second range member 299. At the second range position, the second electric motor 215 provides a torque that is lower than when at the first range position, but the speed is higher. While the first electric motor 210 is a high speed motor, the output speed of the first electric motor 210 is reduced by the first planetary gear 225, and the second electric motor 215 is a low speed motor such that the first gear train 220 is not required to reduce the speed of the output from the electric powertrain 200. This configuration in turn allows the use of two different, or non-interchangeable, motors that have different power profiles such that the first electric motor 210 and second electric motor 215 cumulatively can operate more efficiently.

Figure 3:
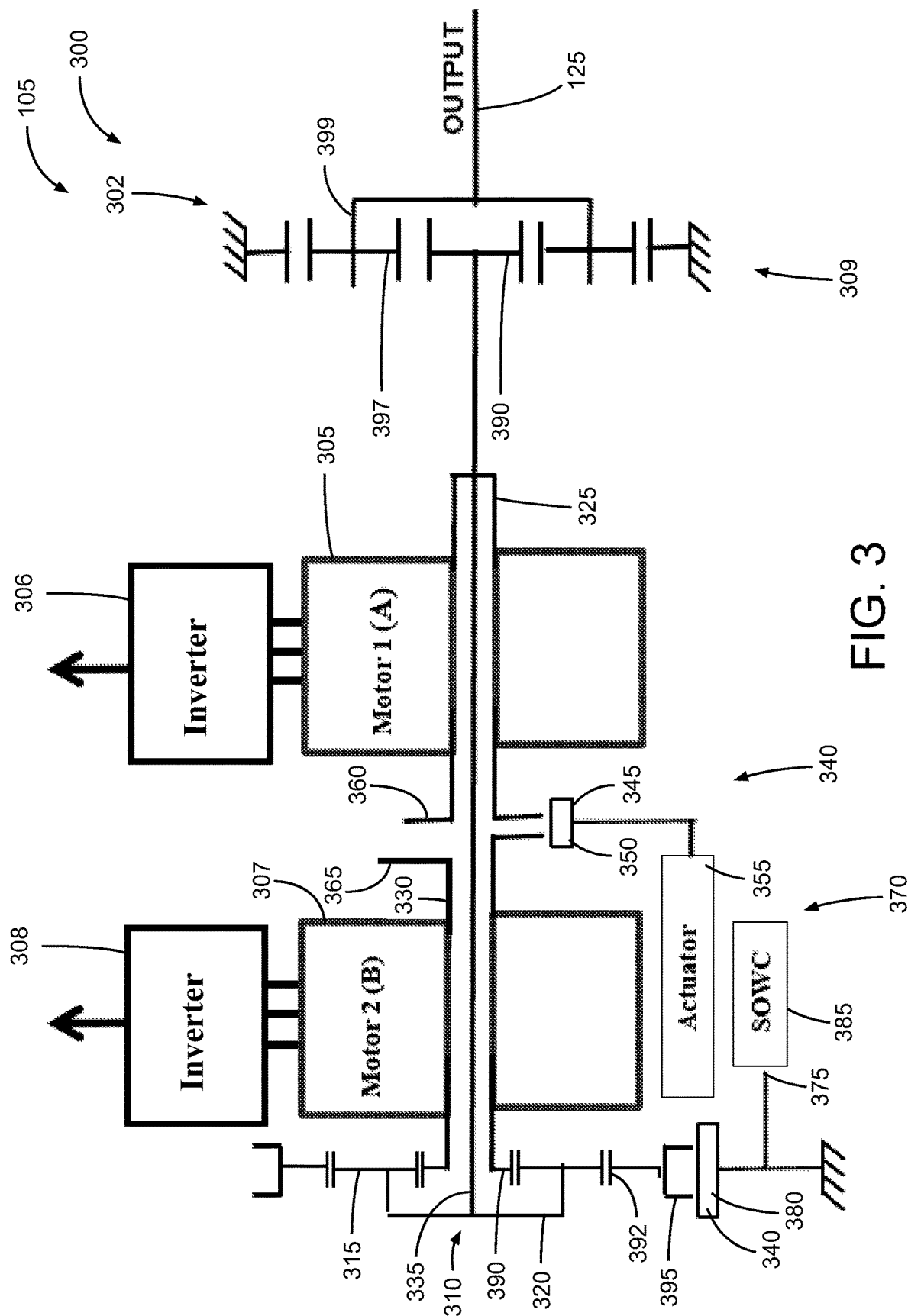
FIG. 3 is a diagrammatic view of another example of an electric powertrain that can be used in the vehicle of FIG. 1.
Figure 4:
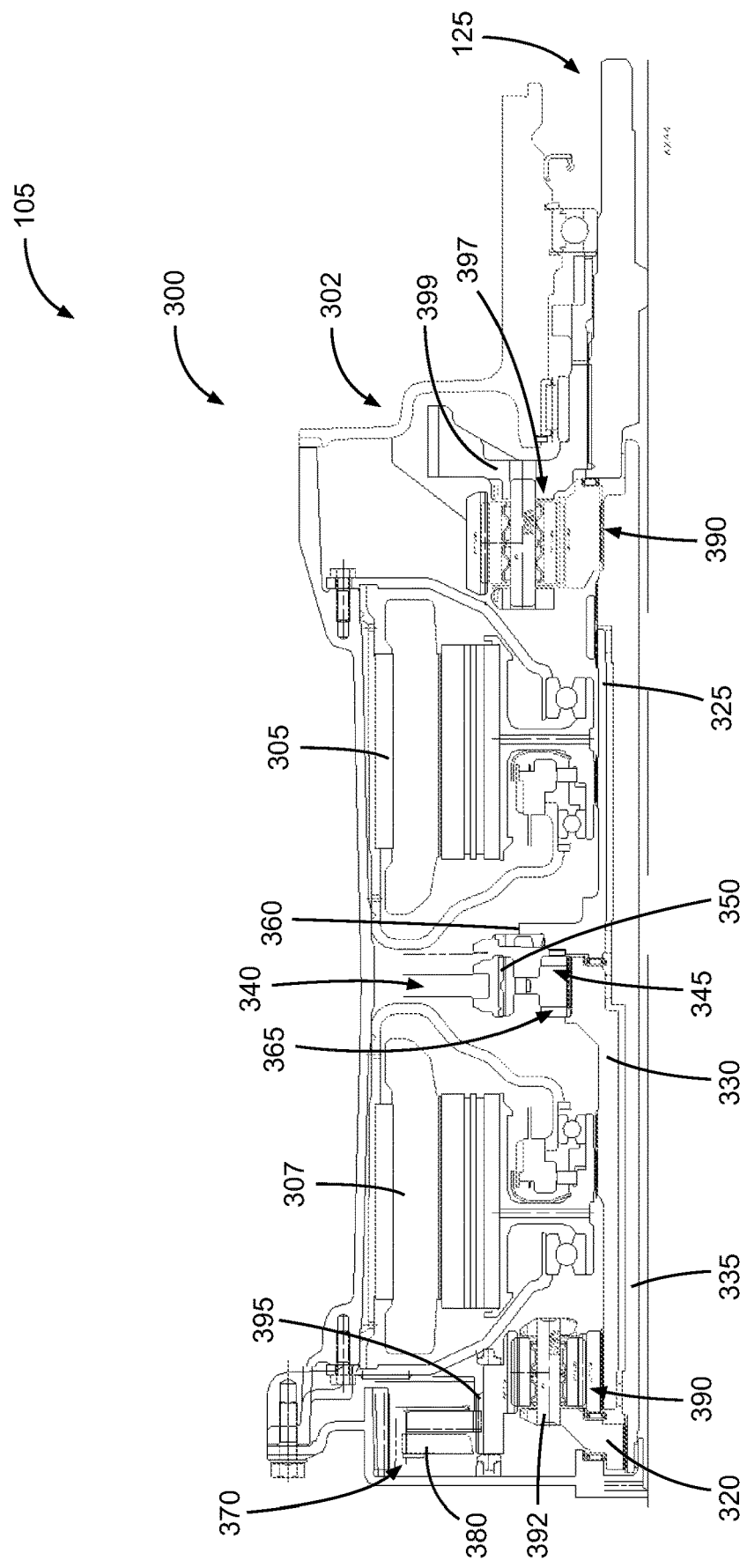
FIG. 4 is a cross-sectional view of the electric powertrain from FIG. 3.

FIG. 3 shows a diagram of another example of an electric powertrain 300 that can be used in the vehicle 100 of FIG. 1, and FIG. 4 shows a cross-sectional view of the electric powertrain 300. The electric powertrain 300 shares a number of components and functions in common with the one described before. For the sake of brevity as well as clarity, these common features will not be described in great detail below, but please refer to the previous discussions of these features.

As depicted, the electric powertrain 300 includes a multiple motor continuous power transmission 302. The transmission 302 of the electric powertrain 300 includes a first electric motor 305 with a first inverter 306 and a second electric motor 307 with a second inverter 308. The first inverter 306 is electrically connected between the ESS 115 and the first electric motor 305, and the second inverter 308 is electrically connected between the ESS 115 and the second electric motor 307. The first inverter 306 and second inverter 308 convert the direct current (DC) from the ESS 115 to alternating current (AC) in order to power the first electric motor 305 and second electric motor 307, respectively. The first electric motor 305 and second electric motor 307 can also act as generators such as during regenerative braking. In such a situation, the first inverter 306 and second inverter 308 convert the AC electrical power from the first electric motor 305 and second electric motor 307, respectively, to DC power that is supplied to the ESS 115. In one example, the first electric motor 305 and second electric motor 307 are the same type of electric motor such that both motors generally provide the same speed and torque output within normal manufacturing tolerances. The first electric motor 305 and second electric motor 307 in one form are interchangeable with one another. The first electric motor 305 and second electric motor 307 in one form are both high speed electric motors. In one specific example, the first electric motor 305 and second electric motor 307 are the same type of high speed electric motor having rated speeds of at least 5,000 rpm, and more particularly, the first electric motor 305 and second electric motor 307 each has a rated speed of at least 10,600 rpm, a rated peak power of at least 390 hp, a rated continuous power of at least 150 hp, a rated continuous torque of at least 240 lb-ft, and a rated peak torque of at least 310 lb-ft.

As can be seen in FIGS. 3 and 4, the electric powertrain 300 includes a first gear train 309 and a second gear train 310. The first gear train 309 is located at the output end of the first electric motor 305 and is proximal to the drive shaft 125. The first gear train 309 includes a first planetary gear 397 with a sun gear 390. Located opposite the second electric motor 307, on the other side of the drive shaft 125 is the second gear train 310. The second gear train 310 includes a second planetary gear 315 with a second carrier 320.

In the illustrated example, the transmission 302 includes a first output shaft 325, a second output shaft 330, and a third output shaft 335 that extend in a longitudinal direction in the electric powertrain 300. The first output shaft 325 and second output shaft 330 are hollow so as to receive the third output shaft 335. The third output shaft 335 extends in a concentric manner inside the first output shaft 325 and second output shaft 330. The second gear train 310 and second planetary gear 315 in one example are respectively secured to the first output shaft 325 and second output shaft 330 via a spline type connection of the types described before.

As shown, the first output shaft 325 and third output shaft 335 are directly connected to the sun gear 390 of the first planetary gear 397. The second output shaft 330 has an interruptible connection with the first output shaft 325 through a first clutch 340 that selectively connects the second output shaft 330 to the first output shaft 325. To provide a compact design, the first clutch 340 is located or sandwiched in between the first electric motor 305 and second electric motor 307. In the illustrated example, the first clutch 340 includes a single position type dog clutch 345, but other types of clutches can be used in other variations. The dog clutch 345 includes a clutch collar 350 and a clutch actuator 355 that is configured to move the clutch collar 350 in a longitudinal direction to engage and disengage the second output shaft 330 from the first output shaft 325. The clutch actuator 355 of the first clutch 340 is operatively connected to the controller 110 so that the controller 110 is able to control the first clutch 340. In the depicted example, the first output shaft 325 has a clutch engagement member 360 and the second output shaft 330 has a range member 365, and the clutch collar 350 of the dog clutch 345 selectively engages and disengages the range member 365 of the second output shaft 330 from the clutch engagement member 360 of the first output shaft 325. In other words, the first output shaft 325 and second output shaft 330 form an interruptible split shaft design that can be selectively connected together so that the torque from the second gear train 310 and second planetary gear 315 can be combined together.

At the end opposite the range member 365, the second output shaft 330 is connected to the second planetary gear 315. Like in the other examples, the second planetary gear 315 includes the sun gear 390, one or more planet gears 392, and a ring gear 395 generally arranged in a concentric manner relative to one another. The second output shaft 330 in the depicted example is connected to the second planetary gear 315 at the sun gear 390. The second planetary gear 315 is in turn connected to the third output shaft 335 through the second carrier 320. Through the second carrier 320, the second planetary gear 315 is able to provide torque to the first output shaft 325 which in turn is provided to the sun gear 390 of the first gear train 309.

The transmission 302 further includes a second clutch 370 that engages the second planetary gear 315. In the illustrated example, the second clutch 370 includes a Selectable One-Way Clutch ("SOWC") 375. The SOWC 375 includes a clutch engagement member 380 configured to engage the ring gear 395 of the second planetary gear 315 and a clutch actuator 385 that selectively engages the clutch engagement member 380 with the ring gear 395 to change the gear ratio for the power supplied by the second planetary gear 315 or disconnects the second electric motor 307. The clutch actuator 385 of the SOWC 375 is operatively connected to the controller 110 so that the controller 110 is able to control the second clutch 370. By controlling the operation of the first clutch 340 and second clutch 370, the controller 110 is able to change and control the speed and torque supplied by the second planetary gear 315 to the first gear train 309. In one form, the first clutch 940 and the second clutch 970 work together to attain the first range position. To attain the first range position, the SOWC 975 is engaged to the ring gear 260 by actuation of the clutch actuator 985. At this time, the first clutch 940 is disengaged from the clutch engagement member 960 so that the first output shaft 925 and the second output shaft 930 are disconnected. To attain the second range position, the SOWC 975 is disengaged from the ring gear 260 by actuation of the clutch actuator 985. This allows the ring gear 260 to freewheel. At this time, the first clutch 940 is actuated by the clutch actuator 955 to engage with the clutch engagement member 960. This connects the first output shaft 925 and the second output shaft 930.

As should be recognized, the second gear train 310 in FIGS. 3 and 4 operates in a similar fashion to the first planetary gear 225 in FIG. 2. When the clutch engagement member 380 of the SOWC 375 engages the ring gear 395, the second gear train 310 reduces the speed and increases the torque supplied to the third output shaft 335 from the second electric motor 307. When the clutch engagement member 380 is disengaged from the ring gear 395, no torque is provided via the second gear train 310. To provide torque from the second electric motor 307, the controller 110 via the dog clutch 345 connects the range member 365 of the second output shaft 330 to the clutch engagement member 360 of the first output shaft 325. In these as well as other operational scenarios, the first gear train 309 reduces the speed of the output provided by the first electric motor 305 and/or second electric motor 307 which are high speed motors.

Figure 5:
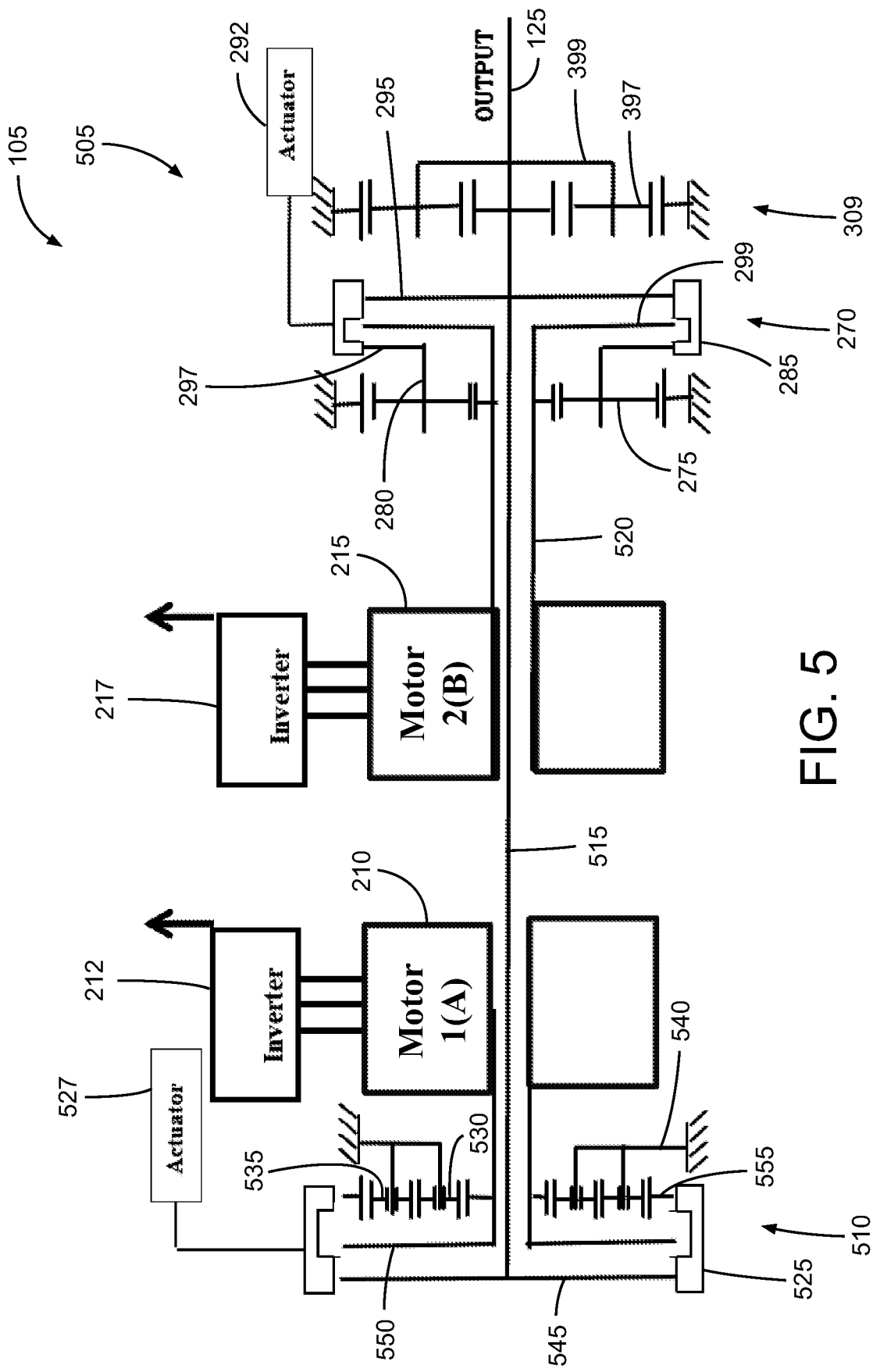
FIG. 5 is a diagrammatic view of a further example of a transmission that can be used in the vehicle of FIG. 1.

FIG. 5 shows a diagram of another example of the powertrain system 105 of FIG. 1. The powertrain system 105 shares a number of components and functions in common with the ones described before (see e.g., FIGS. 2 and 3). For the sake of brevity as well as clarity, these common features will not be described in great detail below, but please refer to the previous discussion.

As depicted, the powertrain system 105 includes a multiple motor continuous power transmission 505. The transmission 505 of the powertrain system 105 includes the first electric motor 210 with the first inverter 212 and the second electric motor 215 with the second inverter 217. The first inverter 212 is electrically connected between the ESS 115 and the first electric motor 210, and the second inverter 217 is electrically connected between the ESS 115 and the second electric motor 215. The first inverter 212 and second inverter 217 convert the direct current (DC) from the ESS 115 to alternating current (AC) in order to power the first electric motor 210 and second electric motor 215, respectively. The first electric motor 210 and second electric motor 215 can also act as generators such as during regenerative braking. In such a situation, the first inverter 212 and second inverter 217 convert the AC electrical power from the first electric motor 210 and second electric motor 215, respectively, to DC power that is supplied to the ESS 115. In one example, the first electric motor 210 and second electric motor 215 are the same type of electric motor such that both motors generally provide the same speed and torque output within normal manufacturing tolerances. The first electric motor 210 and second electric motor 215 in one form are both high speed electric motors, and in another form, the first electric motor 210 and second electric motor 215 are both low speed electric motors. In alternative variations, the first electric motor 210 and second electric motor 215 can be different such that one for example is a high speed motor and the other is a low speed motor.

The transmission 505 of the powertrain system 105 includes the first gear train 309 of the type shown in FIG. 3, the second gear train 270 of the type shown in FIG. 2, and a third gear train 510. The first gear train 309 is located downstream of the second electric motor 215 and is proximal to the drive shaft 125. The second gear train 270 is located just upstream from the first gear train 309 sandwiched between the second electric motor 215 and the first gear train 309. The third gear train 510 is located on the opposite side of the first electric motor 210 and second electric motor 215 where a first output shaft 515 of the transmission 505 meets the third gear train 510. The third gear train 510 includes a third planetary gear 530 and a fourth planetary gear 535 which are meshed and held in position by a third carrier 540. The third carrier 540 is mounted to the transmission housing and does not move. Located between the fourth planetary gear 535 and a second clutch 525 is a first range member 555. The first range member 555 serves to engage the second clutch 525 when in the first range positon. The third gear train 510 also has a second range member 550 which serves to engage the second clutch 525 when in the second range position. Whether in the first or second range positon, the third gear train 510 has a clutch engagement member 545 to engage the second clutch 525 and transmit power through the first output shaft 515. In the illustrated example, the first gear train 309 is in the form of the first planetary gear 397 as shown in FIG. 3, the second gear train 270 is in the form of the second planetary gear 275 as shown in FIG. 2, and the third gear train 510 is in the form of the third planetary gear 530 and the fourth planetary gear 535. The first electric motor 210 and second electric motor 215 respectively have the first output shaft 515 and a second output shaft 520 for providing rotational mechanical power. In the illustrated example, the second output shaft 520 is hollow such that the first output shaft 515 is able to extend through the second output shaft 520 in a concentric manner.

The second gear train 270 and clutch 285 in the powertrain system 105 operate as follows. The controller 110 via the clutch actuator 292 shifts the clutch 285 between neutral, first range, and second range positions. This allows the second electric motor 215 to provide different output torques to the clutch engagement member 295 which are then combined with the torque produced by the first electric motor 210 through the third gear train 510 at the drive shaft 125. When the clutch 285 is in the neutral position the second electric motor 215 does not supply power to the drive shaft 125. In this case all of the output power is being supplied by the first electric motor 210. To place the clutch 285 into the first range positon the clutch actuator 292 moves the clutch 285 to engage with the first range member 297. This allows the second electric motor 215 to provide higher torques to the drive shaft 125. The second range position is achieved by having the clutch actuator 292 move the clutch 285 to engage with the second range member 299. In the second range position, the second electric motor 215 is able to provide less torque than in the first range position, but the speed is higher. The first gear train 309 is made up of the first planetary gear 397 and is connected to the drive shaft 125 by the first carrier 399. The first gear train 309 serves to reduce the speed of the output provided by the first electric motor 210 and/or the second electric motor 215. The second gear train 270 is not connected to a clutch and therefore is constantly in use.

The third gear train 510 and the second clutch 525 operate in a similar fashion to the second gear train 270 and clutch 285 described above. The controller 110 via a second clutch actuator 527 shifts the second clutch 525 between neutral, first range, and second range positions. This allows the first electric motor 210 to provide different output torques to the clutch engagement member 545 which are then sent through the first output shaft 515 to the drive shaft 125. When the second clutch 525 is in the neutral position, the torque runs through the first output shaft 515 to the drive shaft 125 modified only by the first gear train 309. To place the second clutch 525 into the first range positon, the second clutch actuator 527 moves the second clutch 525 to engage with the first range member 555. This allows the first electric motor 210 to provide higher torques through a third planetary gear 530 and a fourth planetary gear 535 which are connected by the third carrier 540. The second range position is achieved by having the second clutch actuator 527 move the second clutch 525 to engage with the second range member 550. In the second range position, the first electric motor 210 provides less torque than in the first range position, but the speed is higher.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Contact" generally refers to a condition and/or state where at least two objects are physically touching. For example, contact requires at least one location where objects are directly or indirectly touching, with or without any other member(s) material in between.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Downstream" generally refers to a direction or relative location that is the same as where power flows in a system.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Energy Storage System" (ESS) or "Energy Storage Unit" generally refers to a device that captures energy produced at one time for use at a later time. The energy can be supplied to the ESS in one or more forms, for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electro-chemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"High Speed Motor" generally refers to a motor that has a rated operating speed of at least 5,000 rpm (revolutions per minute) without the use of gear trains or other similar equipment for changing speed.

"Integrally Formed" generally refers to being formed as or fused into a single piece without needing some form of connection or attachment.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Inverter" or "Power Inverter" generally refers to an electronic device and/or circuitry that at least converts direct current (DC) to alternating current (AC). Certain types of inverters can further include a rectifier that converts AC to DC such that the inverter and rectifier functions are combined together to form a single unit that is sometimes referred to as an inverter. The inverter can be entirely electronic or may be a combination of mechanical devices, like a rotary apparatus, and electronic circuitry. The inverter can further include static type inverters that do not use moving parts to convert DC to AC.

"Lateral" generally refers to being situated on, directed toward, or coming from the side. "Longitudinal" generally relates to length or lengthwise dimension of an object, rather than across.

"Low Speed Motor" generally refers to a motor that has a rated operating speed of less than 5,000 rpm (revolutions per minute) without the use of gear trains or other similar equipment for changing speed.

"Means For" in a claim invokes 35 U.S.C. § 112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

"Mounted" means physically attached to or held in place by. This may be by fasteners, adhesives, conduits, brackets, over molded plastic, or otherwise.

"Multiple" is generally synonymous with the term "plurality" and refers to more than one, or by extension, two or more.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Predominately" is synonymous with greater than 50%.

"Rated Continuous Power" or "Continuous Rated Power" generally refer to an amount of energy or work provided per unit of time (i.e., power) an electric motor will produce without interruption for a rated speed, at a rated torque, and at a rated voltage for the electric motor. In other words, the rated continuous power is usually the power that the electric motor can produce for a long period of time at the rated speed and the rated torque without damaging the electric motor.

"Rated Operating Speed" or "Rated Speed" generally refers to a velocity (i.e., speed) an electric motor will rotate when producing a rated continuous power at a supplied rated voltage for the electric motor. Typically, but not always, the rated operating speed is measured in terms of Revolutions Per Minute (rpm). Generally speaking, the rated operating speed is the prescribed rpm at which the motor operates, keeping the mechanical stability and efficiency of the electric motor in mind. The rated voltage and rated horsepower respectively refer to the maximum voltage and horsepower (hp) where the motor can operate efficiently without being damaged. The value for the rated operating speed will be slightly less than a synchronous speed of the electric motor due to a decrease in speed caused by adding a load (i.e., slip or speed loss). For instance, most alternating current (AC) induction motors with synchronous speeds of 1800 RPM will have normally have rated speeds ranging between about 1720 and about 1770 RPM depending on the amount of slip. Some newer high or energy-efficient electric motors will tend to have rated operating speeds towards a higher end of the range.

"Rated Continuous Torque" or "Continuous Rated Torque" generally refer to a magnitude of twisting force, or torque, an electric motor will produce without interruption for a rated speed and at a rated voltage for the electric motor. In other words, the rated continuous torque is usually a torque that the electric motor can output for a long period of time at the rated speed without damaging the electric motor. Typically, this value is generated close to the maximum speed of the motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively or additionally, the SOWC can be controlled to switch or change the locked and freewheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and freewheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refer to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Upstream" generally refers to a direction or relative location that is opposite from where power flows in a system.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | controller |
| 115 | ESS |
| 120 | CAN |
| 125 | drive shaft |
| 130 | propulsion system |
| 135 | wheels |
| 140 | power cables |
| 200 | electric powertrain |
| 205 | transmission |
| 210 | first electric motor |
| 212 | first inverter |
| 215 | second electric motor |
| 217 | second inverter |
| 220 | first gear train |
| 225 | first planetary gear |
| 230 | sun gear |
| 235 | planet gears |
| 240 | ring gear |
| 245 | first carrier |
| 250 | first output shaft |
| 255 | SOWC |
| 260 | clutch engagement member |
| 265 | clutch actuator |
| 270 | second gear train |
| 275 | second planetary gear |
| 277 | second output shaft |
| 280 | second carrier |
| 285 | clutch |
| 290 | dog clutch |
| 292 | clutch actuator |
| 295 | clutch engagement member |
| 297 | first range member |
| 299 | second range member |
| 300 | electric powertrain |
| 302 | transmission |
| 305 | first electric motor |
| 306 | first inverter |
| 307 | second electric motor |
| 308 | second inverter |
| 309 | first gear train |
| 310 | second gear train |
| 315 | second planetary gear |
| 320 | second carrier |
| 325 | first output shaft |
| 330 | second output shaft |
| 335 | third output shaft |
| 340 | first clutch |
| 345 | dog clutch |
| 350 | clutch collar |
| 355 | clutch actuator |
| 360 | clutch engagement member |

-continued

| Reference Numbers | |
|---|---|
| 365 | range member |
| 370 | second clutch |
| 375 | SOWC |
| 380 | clutch engagement member |
| 385 | clutch actuator |
| 390 | sun gear |
| 392 | planet gears |
| 395 | ring gear |
| 397 | first planetary gear |
| 399 | first carrier |
| 505 | transmission |
| 510 | third gear train |
| 515 | first output shaft |
| 520 | second output shaft |
| 525 | second clutch |
| 527 | second clutch actuator |
| 530 | third planetary gear |
| 535 | fourth planetary gear |
| 540 | third carrier |
| 545 | clutch engagement member |
| 550 | second range member |
| 555 | first range member |

What is claimed is:

1. A powertrain system, comprising:
a first gear train;
a first electric motor connected to an output via the first gear train, wherein the first electric motor has a direct connection to the output, wherein the direct connection is a mechanical linkage that lacks a break in continuity;
a second gear train;
a second electric motor connected to the output via the second gear train, wherein the second electric motor has an indirect connection to the output;
wherein the first electric motor and the second electric motor are sandwiched between the first gear train and the second gear train;
wherein the first electric motor and the second electric motor lack any gear train therebetween;
wherein power is supplied to the output solely through the first and second electric motors; and
wherein the output is configured to move a 40,000 pound or more vehicle.

2. The powertrain system of claim 1, wherein the indirect connection includes a clutch configured to couple the second electric motor to the output.

3. The powertrain system of claim 2, wherein the clutch is a positive clutch.

4. The powertrain system of claim 2, wherein the clutch is a dog clutch.

5. The powertrain system of claim 2, wherein the clutch is moveable between at least a neutral position, a first range position, and a second range position.

6. The powertrain system of claim 5, wherein the clutch at the first range position increases torque supplied from the second electric motor, and wherein the clutch at the second range position decreases torque suppled from the second electric motor.

7. The powertrain system of claim 1, wherein the first electric motor and the second electric motor have different rated operating speeds.

8. The powertrain system of claim 7, wherein the first electric motor is a high speed motor with a rated operating speed of at least 5,000 rpm, and wherein the second electric motor is a low speed motor with a rated operating speed of less than 5,000 rpm.

9. The powertrain system of claim 7, wherein the first electric motor is a low speed motor with a rated operating speed of less than 5,000 rpm, and wherein the second electric motor is a high speed motor with a rated operating speed of at least 5,000 rpm.

10. The powertrain system of claim 1, wherein the first and second electric motors rotate about a common axis of rotation.

11. A powertrain system, comprising:
- a first gear train;
- a first electric motor connected to an output via the first gear train;
- a second gear train;
- a second electric motor connected to the output via the second gear train;
- wherein the first electric motor and the second electric motor are sandwiched between the first gear train and the second gear train;
- wherein the first and second electric motors rotate about a common axis of rotation;
- wherein the first electric motor has a continuous connection to the output and the second electric motor has an intermittent connection to the output;
- wherein the continuous connection is a mechanical linkage that lacks a break in continuity;
- wherein the intermittent connection includes a clutch disposed between the first electric motor and the second electric motor;
- wherein the clutch is moveable between at least a neutral position, a first range position, and a second range position; and
- wherein the clutch is a positive clutch.

12. The powertrain system of claim 11, wherein the first electric motor is located upstream relative to the second electric motor.

13. The powertrain system of claim 11, further comprising:
- a first output shaft connected to the first electric motor;
- a second output shaft connected to the second electric motor;
- a third output shaft;
- wherein the first output shaft and the second output shaft are hollow; and
- wherein the third output shaft extends in a concentric manner inside the first output shaft and the second output shaft.

14. The powertrain system of claim 11, wherein the first gear train includes a first planetary gear, and wherein the second gear train includes a second planetary gear.

15. The powertrain system of claim 14, wherein the second planetary gear includes a sun gear, a ring gear, and one or more planet gears engaged between the sun gear and the ring gear.

16. The powertrain system of claim 15, wherein the second gear train includes a first range member connected to the planet gears of the second planetary gear, and wherein the clutch at the first range position engages the first range member to increase torque from the second electric motor.

17. The powertrain system of claim 11, wherein power is supplied to the output solely through the first and second electric motors, and wherein the output is configured to move a 40,000 pound or more vehicle.

18. The powertrain system of claim 11, wherein the clutch is located downstream of the first electric motor and the second electric motor at the output.

19. The powertrain system of claim 11, wherein the clutch has an actuator and a Selectable One-Way Clutch (SOWC), and wherein the Selectable One-Way Clutch (SOWC) is located upstream from the first electric motor and the second electric motor at the second gear train.

20. The powertrain system of claim 11, wherein the first electric motor and the second electric motor are different from one another, wherein the first electric motor is a high speed motor with a rated operating speed of at least 5,000 rpm, and wherein the second electric motor is a low speed motor with a rated operating speed of less than 5,000 rpm.

* * * * *